United States Patent
Schaeffer et al.

[11] Patent Number: 6,014,263
[45] Date of Patent: Jan. 11, 2000

[54] OPTICAL LENS AND METHOD OF PREVENTING CLOUDING THEREOF AT HIGH TEMPERATURES

[75] Inventors: Jon C. Schaeffer, Milford; Nripendra N. Das, West Chester; Brian F. Mickle, Loveland; Ching-Ho Wang, Fairfield; Matthew S. Tomaszewski; Kevin G. McAllister, both of West Chester, all of Ohio

[73] Assignee: General Electric Company, Cincinnati, Ohio

[21] Appl. No.: 09/071,109

[22] Filed: May 4, 1998

[51] Int. Cl.[7] ................................................ G02B 3/00
[52] U.S. Cl. .................. 359/642; 359/512; 359/808; 72/244; 419/13; 427/554; 427/558
[58] Field of Search ...................... 359/642, 512, 359/513, 808, 809; 75/244; 419/13, 23; 427/554, 557, 558, 559, 545

[56] References Cited

U.S. PATENT DOCUMENTS

| | | | |
|---|---|---|---|
| 4,762,557 | 8/1988 | Nagarajan et al. | 75/244 |
| 4,779,613 | 10/1988 | Hashiguchi et al. | 359/512 |
| 5,210,647 | 5/1993 | Hartnagel et al. | 359/808 |
| 5,212,595 | 5/1993 | Dennison, Jr. et al. | 359/513 |
| 5,602,683 | 2/1997 | Straaijer et al. | 359/809 |
| 5,759,640 | 6/1998 | Mannava et al. | 427/554 |

*Primary Examiner*—Loha Ben
*Attorney, Agent, or Firm*—Andrew C. Hess; David L. Narciso

[57] ABSTRACT

A method for preventing clouding of a lens employed in a high-temperature oxidizing environment, an example of which is a lens of a pyrometer used to sense exhaust gas temperature (EGT) of a gas turbine engine. Clouding is prevented by inhibiting the generation of volatile oxide species that react with high-temperature lens materials, forming deposits including oxides of chromium, molybdenum and other elements having volatile oxide species. The method is particularly directed to a pyrometer whose lens is formed of sapphire (alumina) or silica, and is mounted within a structure formed of a material containing chromium and/or molybdenum, such as a superalloy or stainless steel. The method entails forming an alumina scale-forming barrier coating such as a diffusion aluminide on surfaces of the structure that are subject to oxidation and high temperatures. According to the invention, the alumina scale formed by the barrier coating inhibits the generation of other oxides at the coated surfaces, which would otherwise form volatile oxides that react with and form deposit on the lens. By inhibiting the formation of oxides other than alumina on surfaces surrounding the lens, lens clouding caused from volatile oxides is avoided. As a result, the optical performance of the lens is not degraded, and the precision of a pyrometer employing the lens to sense temperatures is maintained during operation of the engine.

20 Claims, 1 Drawing Sheet

OPTICAL LENS AND METHOD OF PREVENTING CLOUDING THEREOF AT HIGH TEMPERATURES

FIELD OF THE INVENTION

The present invention relates to optical lenses employed in high temperature oxidizing environments, such as the lens of a pyrometer used in the turbine section of a gas turbine engine. More particularly, this invention relates to a method of preventing clouding of the lens material as a result of the release and action of volatile species from nearby metallic structures.

BACKGROUND OF THE INVENTION

Exhaust gas temperatures (EGT) of gas turbine engines are often sensed with pyrometers to provide engine control feedback. Pyrometers operate on the basis of sensing the quantity or intensity of radiant energy emitted proportional to the fourth power of absolute temperature. Because the lens of a pyrometer used to sense EGT is typically located a distance from the area of focus, the lens is often enclosed within a tubular-shaped structure having an open end directed at the target region where temperature is to be sensed. The pyrometer itself is located in the turbine section, and is therefore subject to oxidation and extremely high temperatures. For this reason, the tubular-shaped structure is typically a superalloy or stainless steel. The lens is typically formed from such materials as sapphire (alumina) and silica glass.

In the high-temperature oxidizing environment of a gas turbine engine, the precision of the pyrometer can be affected by deposits on the lens, an event referred to as "clouding." For example, clouding of a pyrometer's lens can cause the pyrometer to indicate an EGT that is lower than what actually exists in the turbine section, causing the engine fuel control system to increase the EGT and result in flow path hardware such as blades, vanes and shrouds operating at higher temperatures than intended. A primary deposit on the lenses of certain EGT pyrometers has been determined to be chromium-rich from an unknown source. It would be desirable if the deposition mechanism for chromium and other potential deposits on lenses used at high temperatures could be prevented.

SUMMARY OF THE INVENTION

According to the present invention, a method is provided for preventing the clouding of a lens employed in a high-temperature oxidizing environment, an example of which is a lens of a pyrometer used to sense exhaust gas temperature (EGT) of a gas turbine engine. Notable lens materials include sapphire (alumina) and silica, though the invention is also applicable to other radiation-transparent materials. Clouding is prevented by inhibiting the generation of volatile oxide species that have been unexpectedly found to form and then react with lens materials, forming deposits including oxides of chromium, molybdenum and/or other elements capable of forming volatile oxides. The method of the invention is particularly directed to a pyrometer whose lens is formed of sapphire or silica, and is mounted within a structure formed of a material containing chromium and/or molybdenum, such as a superalloy or stainless steel.

The invention entails forming an alumina scale-forming barrier coating such as a diffusion aluminide on surfaces of the structure, and particular on interior surface regions near the lens that are subject to oxidation and high temperatures, such as that found in the turbine section of a gas turbine engine. According to the invention, the alumina scale formed by the barrier coating inhibits the generation of other oxides, e.g., oxides of chromium and molybdenum, at the surface region. Surprisingly, such oxides have been determined to form volatile oxides at temperatures of 1200° F. (about 650° C.) and higher, which then react with and form deposits on alumina and silica lens. By inhibiting the formation of oxides other than alumina on surfaces surrounding the lens, lens clouding by the generation of volatile oxides that will react with the lens is avoided. As a result, the optical performance of the lens is not degraded, and the precision of a pyrometer employing the lens to sense temperatures is maintained during operation of the engine.

Other objects and advantages of this invention will be better appreciated from the following detailed description.

DETAILED DESCRIPTION OF THE INVENTION

Figure 1:
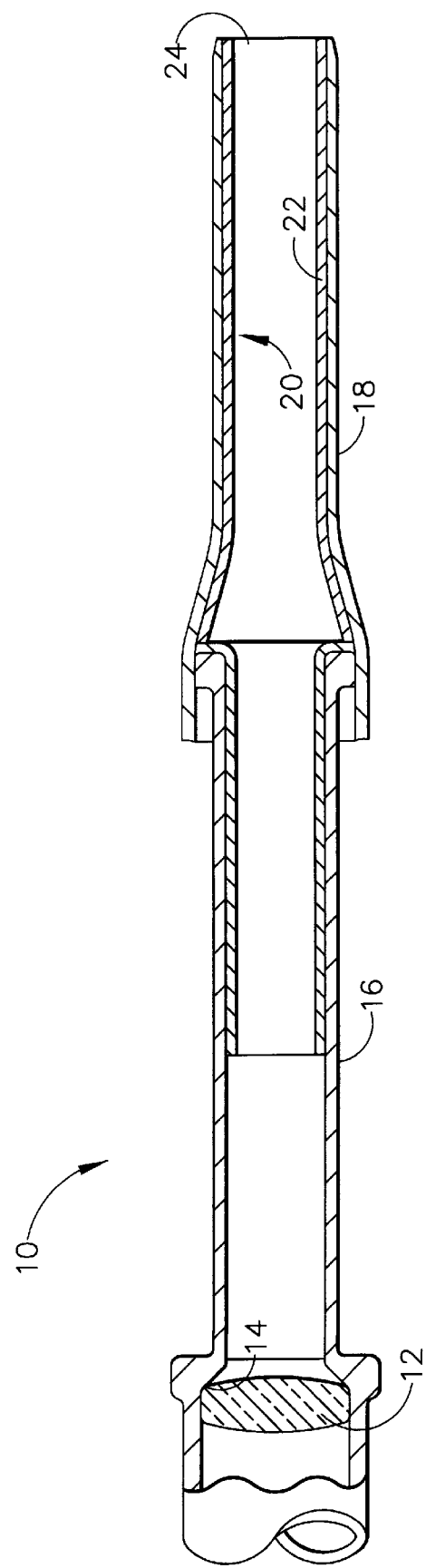
FIG. 1 is a cross-sectional representation of a portion of a turbine pyrometer having a barrier coating in accordance with this invention.

A section of a pyrometer 10 of a type used in a gas turbine engine is represented in FIG. 1. While the invention will be described with reference to the pyrometer 10 and its use for sensing the exhaust gas temperature (EGT) of a gas turbine engine, other types of pyrometers and lenses are to be understood as benefiting from the teachings of the present invention. Accordingly, the scope of this invention is not limited to a pyrometer of any particular type, but generally encompasses any type of lens that is subject to high temperatures in an oxidizing environment.

As shown in FIG. 1, a lens 12 is mounted against an annular shoulder 14 within the pyrometer 10. Preferred materials for the lens 12 include sapphire (alumina) and silica due to the optical transparency of these materials and the high temperatures to which the lens 12 is subjected, though it is foreseeable that other materials could be used. As shown, the pyrometer 10 has a housing with a tubular portion formed by two sections 16 and 18, though it is within the scope of the invention that the portion of the pyrometer 10 shown could have a unitary construction. The pyrometer 10 has one end 24 open to the region to be sensed, through which radiation is received and focused by the lens 12. The installation of the pyrometer 10 in a gas turbine engine results in the tube sections 16 and 18 being subject to the extreme oxidation and temperature environment of the turbine section being sensed. Accordingly, the tube sections 16 and 18 are preferably formed of a high-temperature material such as a nickel, cobalt or iron-base superalloy or a stainless steel.

Pyrometers having the construction shown in FIG. 1 were discovered to exhibit an error attributable to lens clouding. Examinations of the pyrometer lenses have indicated the presence of chromium-rich and molybdenum-rich deposits, likely chromium oxides and molybdenum oxides, as thick as one micrometer on the outward surface of each lens. Quite unexpectedly, the source of the deposits was determined to be the structure surrounding the lens—namely, the housing formed by the tubular sections 16 and 18. More particularly, while chromium-containing and molybdenum-containing materials, such as superalloys and stainless steels, can form chromium oxide and molybdenum oxide surface scale, respectively, under appropriate conditions, investigations showed that these oxides subsequently oxidize in the hostile environment of the turbine section to form the volatile oxide species chromium trioxide ($CrO_3$) and molybdenum trioxide ($MoO_3$), respectively. It was further determined that each of these species reacted with the lens 12 to form deposits on the lens surface—chromium trioxide depositing a layer of chromium and/or its oxide; molybdenum trioxide depositing a layer of molybdenum and/or its oxide. The oxides on the lens surface cause a modification of the radiation passing through the lens 12 and an erroneous reading by the pyrometer 10. Based on this determination, other volatile oxide species are believed to also potentially cause clouding of the lens 12.

While the existence of volatile oxides is well known, the investigation leading to this invention unexpectedly determined that these volatile oxides are generated at relatively low temperatures (less than 1650° F. (about 900° C.)), as low as about 1200° F. (about 650° C.)) under conditions found in the turbine section of a gas turbine engine. What was unexpected and remains undetermined is how the volatile oxides are transported to the lens 12, and the nature of the condensation that subsequently occurs at the lens surface.

As a solution, this invention entails coating the interior surfaces 20 of at least the outermost tubular section 18 and preferably at least a portion of the tubular section 16 with an alumina scale-forming coating 22, such that the predominant oxide that forms in the hottest sections of the pyrometer 10 is alumina ($Al_2O_3$) instead of chromia and other oxides prone to forming volatile oxides under the high-temperature and oxidizing environment of the pyrometer 10. Alumina is preferred because it does not readily oxidize to a volatile species at the temperatures at which EGT pyrometers are used. A suitable coating 22 is one that develops a sufficiently uniform alumina scale to inhibit the formation of other oxides. The exterior of the tubular sections 16 and 18 and the interior surface regions of the pyrometer 10 nearest the lens 12 need not be coated, and certain surface regions are preferably left uncoated in order to maintain their manufactured dimensions and avoid any possible modification of mechanical properties. Nonetheless, it is foreseeable that the barrier coating 22 could be applied to surface regions other than those shown in FIG. 1.

During an evaluation of this invention, pyrometers of the type shown in FIG. 1 underwent aluminizing by pack cementation to form an aluminide coating on those regions of the pyrometers that would experience an operating temperature of at least 1200° F. (about 650° C.). The pyrometer housings were formed of the nickel-base Inconel 625 superalloy, with the tip region of the pyrometers being formed of the cobalt-base L-605 superalloy. Aluminiding was chosen because diffusion aluminides are known for their ability to form a protective alumina scale. While pack cementation was used to form the aluminide, a chemical vapor deposition process or a slurry or sol-gel could have been used. These deposition methods are suitable as each can coat the interior surface of a structure having a large aspect ratio (length:diameter). The exterior surfaces of the pyrometer housings were masked with an oxide slurry, as were the interior surfaces where the lenses would be subsequently secured. The remaining sections of the housings were then packed with a powder mixture containing about eight weight percent aluminum-containing metallic powder as an aluminum donor, about 0.2 weight percent $NH_4F$ as the carrier or activator, with the balance alumina powder as an inert filler to prevent sintering of the powder. The metallic powder was a composition disclosed in U.S. Pat. No. 3,540,878, as being a ternary Ti—Al—C alloy containing, in weight percent, about 50–70% titanium, about 20–48% aluminum, and about 0.5–9% carbon, with a dispersion of $Ti_2AlC$ complex carbide in a matrix of titanium, aluminum or their alloys. During the aluminizing process, the activator reacts with the Ti—Al—C alloy to form a volatile aluminum halide, which then reacts at the substrate surface being treated to form an MAl intermetallic, where M is iron, nickel or cobalt, depending on the content of the substrate material.

Following packing, the pyrometer housings were heated to about 1925° F. (about 1000° C.) for about four hours in a hydrogen-argon atmosphere, which yielded aluminide coatings having thicknesses of about 0.5 to about 2 mils (about 13 to about 50 μm). Sapphire lenses were then installed in the housings, and the resulting pyrometers installed in gas turbine engines that were operated over 750 engine cycles that included temperature excursions in excess of about 1800° F. (about 980° C.). At the completion of the test, examination of the pyrometers indicated that a temperature shift had not occurred, and disassembly of the pyrometers evidenced that the lenses had not become clouded. From these tests, it was determined that the aluminide coatings inhibited the growth of chromium-rich oxides on the coated surfaces, and therefore prevented the generation of the volatile chromium trioxide ($CrO_3$) that would cause lens clouding.

While the testing described above was particularly directed to preventing the deposition of chromium-rich oxides on sapphire lenses, the effect of the aluminide coating would also be useful to prevent the clouding of other high-temperature lens materials by deposits of other volatile compounds, including molybdenum-rich oxides—which can form if the structure surrounding the lens contains molybdenum. Other potential sources of clouding include those elements with a volatile oxide, including tungsten, rhenium, manganese, ruthenium, boron and silicon. In addition, while coating thicknesses in the range of 0.5 to 2 mils, were evaluated, it is believed that greater and lesser thicknesses could be used. Therefore, the scope of the invention is to be limited only by the following claims.

What is claimed is:

1. An article exposed to an oxidizing atmosphere, the article comprising:

a lens;

a structure within which the lens is mounted, the structure being formed of a material containing at least one element having a volatile oxide; and an alumina scale-forming coating on the structure, the coating covering a surface region of the structure subject to oxidation in the oxidizing atmosphere, the coating inhibiting the generation at the surface region of the volatile oxide of the at least one element.

2. An article as recited in claim 1, wherein the article is a pyrometer.

3. An article as recited in claim 1, wherein the article is a component of a gas turbine engine.

4. An article as recited in claim 1, wherein the structure is formed of a superalloy.

5. An article as recited in claim 1, wherein the structure is a tubular member within which the lens is mounted.

6. An article as recited in claim 5, wherein the surface region of the structure subject to oxidation is an interior surface region of the tubular member.

7. An article as recited in claim 1, further comprising an alumina scale on the coating.

8. An article as recited in claim 1, wherein the coating is a diffusion aluminide coating.

9. An article as recited in claim 1, wherein the coating contains MAl intermetallic, where M is iron, nickel, cobalt or combinations thereof.

10. An article as recited in claim 1, wherein the at least one element is chosen from the group consisting of chromium and molybdenum.

11. A pyrometer mounted on a gas turbine engine, the pyrometer comprising:

a lens formed of a material selected from the group consisting of alumina and silica;

a structure having a tubular portion within which the lens is mounted, at least an interior surface region of the tubular portion being formed of a superalloy containing at least one element chosen from the group consisting of chromium and molybdenum; and an alumina scale-forming coating covering the interior surface region of the tubular portion, the coating having an alumina scale that inhibits generation of chromium and molybdenum oxides from the interior surface region when the tubular portion is subjected to an oxidizing atmosphere at a temperature of at least 1200° F.

12. A pyrometer as recited in claim 11, wherein the pyrometer is a component of a gas turbine engine.

13. A pyrometer as recited in claim 11, wherein the surface region is an interior surface region of the tubular portion.

14. A pyrometer as recited in claim 11, wherein the coating is a diffusion aluminide coating.

15. A method for preventing the clouding of a lens from deposits generated by volatile oxide species, the method comprising the steps of:

providing a lens mounted within a structure formed of a material containing at least one element having a volatile oxide; and forming an alumina scale-forming coating on the structure, the coating covering a surface region of the structure subject to oxidation in an oxidizing atmosphere, the coating inhibiting the generation of chromium and molybdenum oxides at the surface region.

16. A method as recited in claim 15, wherein the article is a pyrometer.

17. A method as recited in claim 15, wherein the structure has a superalloy portion within which the lens is mounted, the surface region of the structure being an interior surface region of the superalloy portion.

18. A method as recited in claim 15, further comprising development of an alumina scale on the coating.

19. A method as recited in claim 15, wherein the coating is a diffusion aluminide coating.

20. A method as recited in claim 15, wherein the lens is formed of a material selected from the group consisting of alumina and silica, and wherein the at least one element is chosen from the group consisting of chromium and molybdenum.

* * * * *